(12) United States Patent
Tan (10) Patent No.: US 10,025,440 B2
(45) Date of Patent: Jul. 17, 2018

(54) CORRELATED DATA ACQUISITION AMONG DIFFERENT TOUCH SENSORS

(71) Applicant: STMicroelectronics Asia Pacific Pte Ltd, Singapore (SG)

(72) Inventor: Kien Beng Tan, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 18 days.

(21) Appl. No.: 15/208,894

(22) Filed: Jul. 13, 2016

(65) Prior Publication Data

US 2018/0018037 A1    Jan. 18, 2018

(51) Int. Cl.
| *G06F 3/045* | (2006.01) |
| *G06F 3/044* | (2006.01) |
| *G06F 3/041* | (2006.01) |

(52) U.S. Cl.
CPC ............ *G06F 3/044* (2013.01); *G06F 3/0414* (2013.01); *G06F 3/0418* (2013.01); *G06F 2203/04105* (2013.01); *G06F 2203/04111* (2013.01)

(58) Field of Classification Search
CPC .... G06F 3/03547; G06F 3/041; G06F 3/0414; G06F 3/044; G06F 2203/04103; G06F 2203/04105; G01L 1/14; G01L 1/146
See application file for complete search history.

(56) References Cited

U.S. PATENT DOCUMENTS

| 4,680,429 | A | * | 7/1987 | Murdock | G06F 3/045 178/18.05 |
| 6,826,968 | B2 | | 12/2004 | Manaresi et al. | |
| 7,030,860 | B1 | * | 4/2006 | Hsu | G06F 3/044 178/18.06 |
| 2003/0080755 | A1 | * | 5/2003 | Kobayashi | G01D 5/2405 324/658 |
| 2011/0187666 | A1 | * | 8/2011 | Min | G06F 3/041 345/173 |
| 2011/0234528 | A1 | * | 9/2011 | Guedon | G06F 3/0416 345/174 |
| 2012/0112817 | A1 | * | 5/2012 | Guedon | H03M 3/356 327/517 |
| 2013/0057507 | A1 | * | 3/2013 | Shin | G06F 3/044 345/174 |
| 2013/0069884 | A1 | * | 3/2013 | Cheng | G06F 3/041 345/173 |
| 2013/0069894 | A1 | * | 3/2013 | Chen | G06F 3/0412 345/173 |

(Continued)

*Primary Examiner* — Joe H Cheng
(74) *Attorney, Agent, or Firm* — Crowe & Dunlevy (57) ABSTRACT

Disclosed herein is an electronic device including a first touch circuit to be coupled to a first touch sensing unit, the first touch sensing unit having first drive lines and first sense lines intersecting the first drive lines. A second touch circuit is to be coupled to a second touch sensing unit, the second touch sensing unit having second drive lines and second sense lines intersecting the second drive lines. A touch force circuit is to be coupled to a touch force sensing unit, the touch force sensing unit having third drive lines and third sense lines intersecting the third drive lines. The first touch circuit, second touch circuit, and touch force circuit are configured to drive the first, second, and third drive lines as a function of a synchronization signal, and acquire data from the first, second, and third sense lines as a function of the synchronization signal.

23 Claims, 8 Drawing Sheets

(56) References Cited

U.S. PATENT DOCUMENTS

| | | | | |
|---|---|---|---|---|
| 2015/0116256 A1* | 4/2015 | Hsu | .................. | G06F 3/044 |
| | | | | 345/174 |
| 2015/0346887 A1* | 12/2015 | Cho | .................. | G06F 3/0412 |
| | | | | 345/174 |
| 2016/0139732 A1* | 5/2016 | Takeda | .................. | G06F 3/044 |
| | | | | 345/174 |
| 2016/0283031 A1* | 9/2016 | Hwang | .................. | G06F 3/0412 |
| 2016/0306465 A1* | 10/2016 | Ahn | .................. | G06F 3/0416 |
| 2016/0357315 A1* | 12/2016 | Huang | .................. | G06F 3/044 |
| 2017/0024602 A1* | 1/2017 | Han | .................. | G06K 9/00013 |
| 2017/0108970 A1* | 4/2017 | Kim | .................. | G06F 3/0412 |
| 2017/0162121 A1* | 6/2017 | Yang | .................. | G09G 3/3266 |
| 2017/0315669 A1* | 11/2017 | Oh | .................. | G06F 3/0412 |

\* cited by examiner

CORRELATED DATA ACQUISITION AMONG DIFFERENT TOUCH SENSORS

TECHNICAL FIELD

The present disclosure generally relates to capacitive touch screen controller integrated circuits, and, more particularly, to a technique for using a touch screen controller integrated circuit to acquire touch data from different touch sensors in a correlated fashion.

BACKGROUND

A touch screen display is a device that can detect an object in contact therewith or in proximity thereto. The touch screen display includes display layer covered with a touch-sensitive matrix that can detect a user's touch by way of a finger or stylus, for example. Touch screen displays are used in various applications such as mobile phones, tablets, and smartwatches. A touch screen display may enable various types of user input, such as touch selection of items or alphanumeric input via a displayed virtual keypad. Touch screen displays can measure various parameters of the user's touch, such as the location, duration, pressure, etc.

One type of touch screen display is a capacitive touch screen. A capacitive touch screen may include a matrix of conductive rows and columns overlaid on the display layer forming mutual capacitance sensors. In mutual capacitance sensors, a mutual capacitance at the intersection of each row and column of the matrix may be sensed. A change in mutual capacitance between a row and a column may indicate that an object, such as a finger, is touching the screen or is in proximity to the screen near the region of intersection of the row and column.

In some electronic devices, a capacitive touch screen may have multiple layers of mutual capacitance sensors in a stacked arrangement, with one layer being used to determine the X and Y coordinates of a touch location, and with another layer being used to determine the force or pressure with which the object making the touch presses against the capacitive touch screen. These different sensing layers may contain different numbers of mutual capacitance sensors. Due to the different number of mutual capacitance sensors, the pitch of these different sensing layers is not equal, which may adversely affect the accuracy of acquired touch data, in that data of a given touch event as acquired by the different sensing layers may not be cross correlated between those different sensing layers.

Thus, a need exists within the art for techniques by which touch data collected from different mutual capacitance sensors can be cross correlated, at the time of acquisition.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Disclosed herein is an electronic device including a first touch circuit to be coupled to a first touch sensing unit, the first touch sensing unit having first drive lines and first sense lines intersecting the first drive lines. A second touch circuit is to be coupled to a second touch sensing unit, the second touch sensing unit having second drive lines and second sense lines intersecting the second drive lines. A touch force circuit is to be coupled to a touch force sensing unit, the touch force sensing unit having third drive lines and third sense lines intersecting the third drive lines. The first touch circuit, second touch circuit, and touch force circuit are configured to drive the first, second, and third drive lines as a function of a synchronization signal, and acquire data from the first, second, and third sense lines as a function of the synchronization signal.

A method aspect disclosed herein includes generating a synchronization signal. In response to the synchronization signal, first, second, and third drive lines are driven, and data is acquired from first, second, and third sense lines intersecting the first, second, and third drive lines. The synchronization signal is not a system clock signal.

Also disclosed herein is an electronic device including a first touch circuit to be coupled to a first touch sensing unit, and a second touch circuit to be coupled to a second touch sensing unit. One of the first touch circuit and the second touch integrated circuit is configured to generate a synchronization signal. The first and second touch circuits are configured to, in response to receipt of the synchronization signal, synchronously acquire touch data from the first and second touch sensing units, respectively.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements in alternative embodiments.

Figure 1A:
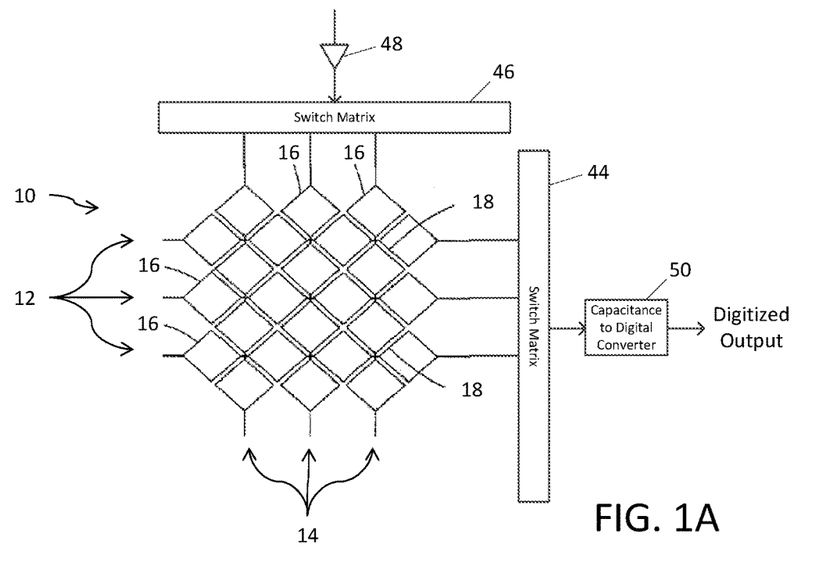
FIG. 1A illustrates a portion of a capacitive touch matrix for touch location sensing.

Reference is now made to FIG. 1A showing a portion of a capacitive touch matrix 10 for touch location sensing comprising a plurality of conductive rows 12 and plurality of conductive columns 14. Each row 12 and column 14 is formed by a plurality of serially connected diamond shaped regions 16 forming a conductive line or trace. The conductive rows 12 and the conductive columns 14 cross above or below each other at intersection points, but are not in electrical contact with one another. Because of the diamond pattern, the conductive rows 12 and the conductive columns 14 are separated from each other by capacitive gaps 18. The diamond pattern may provide decreased capacitance between conductive rows 12 and conductive columns 14. Capacitive touch matrix 10 may sense an object that modifies the fringing electric field above the capacitive gaps 18 when the object is in contact or in proximity to the matrix 10.

Figure 1B:
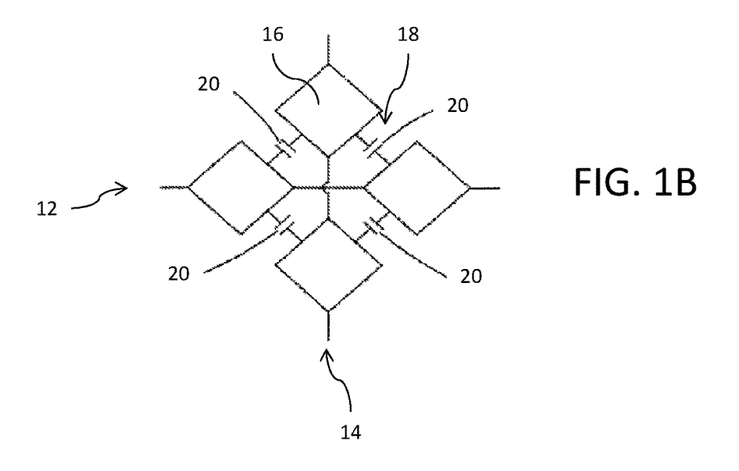
FIG. 1B illustrates a mutual capacitance intersection in the matrix.

FIG. 1B shows that when a conductive row 12 and a conductive column 14 are selected by the switch matrices 44 and 46, the total capacitance of a capacitance sensor formed between row and column conductors is the sum of four capacitances 20 between the four adjacent diamond-shaped regions 16 of the selected row and column. The mutual capacitance of the capacitance sensor between the selected row 12 and column 14 conductors can be sensed to determine whether an object is in contact with or in proximity to the matrix 10 above the region in which the four capacitances 20 are formed. Each conductive row 12 and conductive column 14 of the capacitive touch matrix 10 may be selected in succession to sense the capacitances at each intersection position of the touch matrix.

Figure 1C:
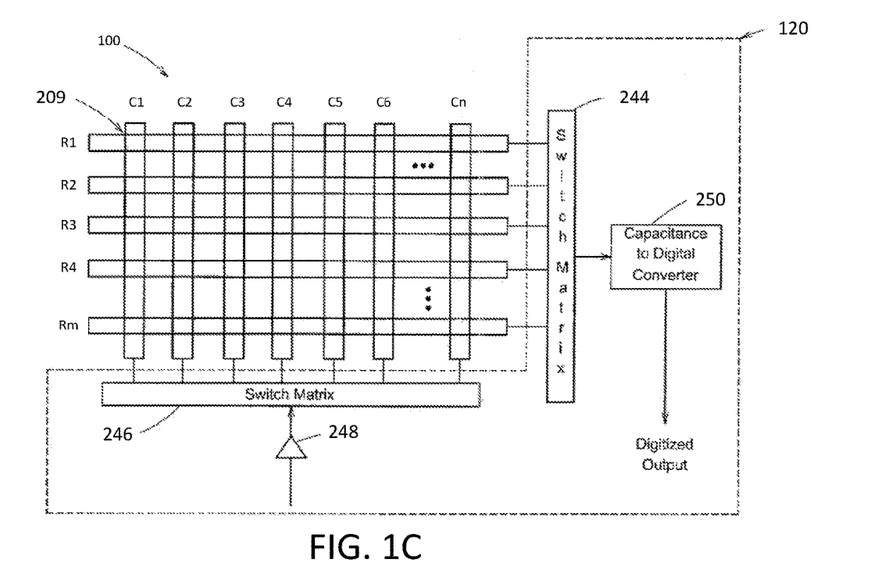
FIG. 1C is a block diagram of a touch screen system for touch pressure sensing.
Figure 1D:
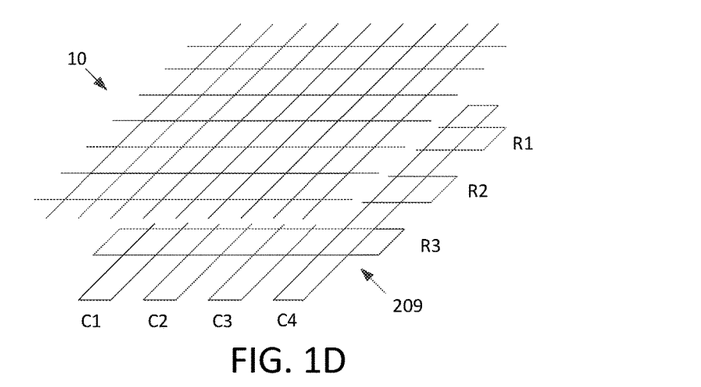
FIG. 1D is illustrates a portion of a capacitive touch matrix for touch pressure sensing.

Shown in FIG. 1D is a portion of a touch screen system 100 including the capacitive touch matrix 10 (for sensing touch location), and a capacitive touch force matrix 209 (for sensing touch pressure). The capacitive touch force matrix 209 includes columns and rows that are spaced apart vertically by a compressible layer but cross one another. The pressure of a user's finger on a touch screen incorporating the capacitive touch force matrix 209 changes the distance between the rows and columns, and thus changes the capacitance between the two.

FIG. 1C is a block diagram of a touch screen system 100 that includes the capacitive touch matrix 209 and an associated touch force IC 120. The touch force IC 120 includes a row switch matrix 244 and a column switch matrix 246 for selection of rows and columns of the capacitive touch force matrix, such selection being made to select a particular mutual capacitance within the matrix 209 for sensing. The column switch matrix 246 receives a drive signal generated by a driver 248 and selectively applies the drive signal in a sequential manner to each of the columns C1-C4. The row switch matrix 244 sequentially selects one or more of the rows R1-R3 for connection to a capacitance-to-digital converter circuit 250 that operates to sense charge of the mutual capacitance between rows R1-R3 and columns C1-C4 of the capacitive touch matrix 209 and convert that sensed charge to a digital value for output.

Figure 2A:
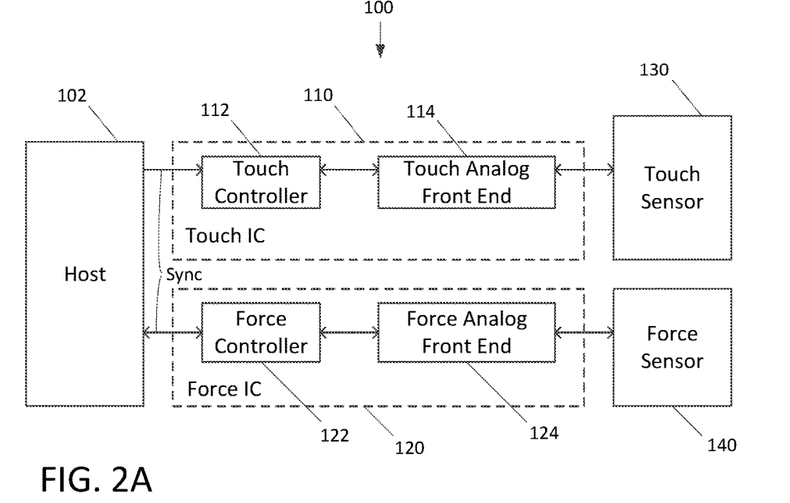
FIG. 2A is a schematic block diagram of an embodiment of an electronic device capable of acquiring touch data in a correlated fashion, in accordance with this disclosure.
Figure 2B:
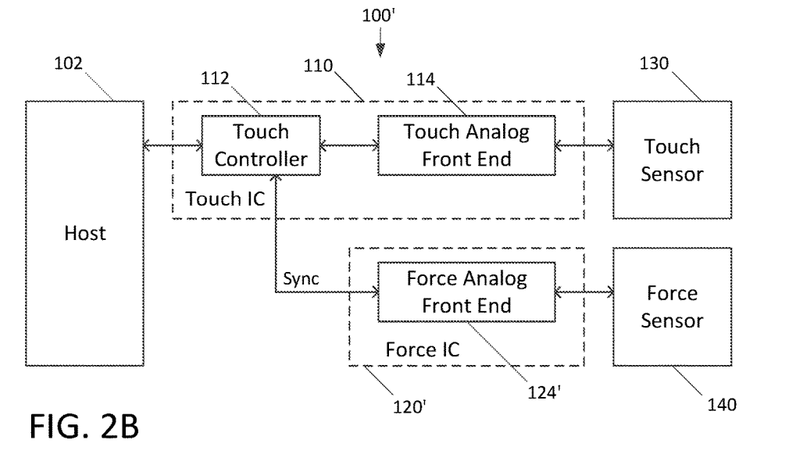
FIG. 2B is a schematic block diagram of another embodiment of an electronic device capable of acquiring touch data in a correlated fashion, in accordance with this disclosure.

With additional reference to FIGS. 2A-2B, further details of the touch screen system 100 are now given. The touch screen system 100 may be incorporated into any suitable electronic device, such as a smartphone, tablet, smartwatch, laptop, or vehicle infotainment system. The touch screen system 100 includes a host device 102 for interfacing with the processor or system on a chip (SoC) of the electronic device, a touch location IC 110 for operating and acquiring touch location data from touch sensors 130 (which include the capacitive touch matrix 10), and a touch force IC 120 for operating and acquiring touch force data from touch force sensors 140 (which include a capacitive touch matrix similar to the capacitive touch force matrix 209).

The touch IC 110 includes a touch screen controller 112 in bidirectional communication with the host device 102. The touch screen controller 112 operates the touch analog front end 114, which includes the various components of the touch IC 110 described above. Similarly, the force IC 120 includes a force controller 122 in bidirectional communication with the host device 102. The force controller 122 operates the force analog front end 124, which includes components similar to those described above with respect to the touch force IC 209.

Either the touch controller 112 or force controller 122 of the embodiment shown in FIG. 2A, in operation, generates a synchronization signal, which is fed to the other through the host 102. The function of this synchronization signal will be described in detail below.

An alternative embodiment is shown in FIG. 2B in which the force IC 120' lacks an on-chip touch controller, and instead the touch controller 112 of the touch IC itself 110 also functions as the touch controller for the force IC 120'. Here, the touch controller 112 generates the synchronization signal and feeds it directly to the force IC 120'.

Figure 3:
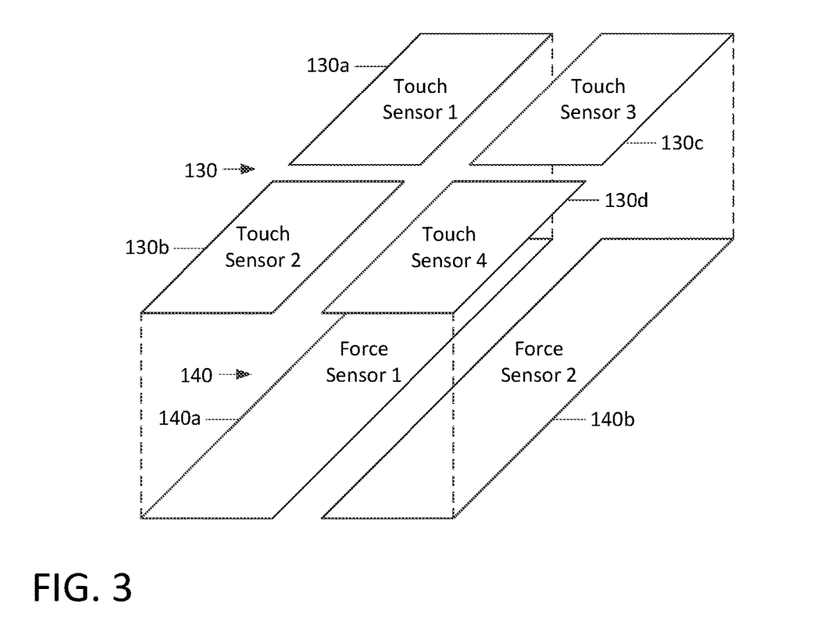
FIG. 3 is a schematic block diagram of an embodiment of the touch and force sensors of FIGS. 2A and 2B that illustrates the different sensing layers thereof.

The touch sensor 130, as shown in FIG. 3, makes up an upper sensing layer, and illustratively includes four touch sensors or touch sensor regions 130a-130d. The touch force sensor 140 makes up a lower sensing layer, and illustratively includes two force sensors or force sensor regions 140a-140b. It should be noted that the force sensors 140a-140b are larger than the touch sensors 130a-130d, meaning that the touch sensor 130 has a different pitch (which here is greater, but may in some applications possibly be less) than that of the force sensor 140.

The synchronization signal can be used by the touch IC 110 and force IC 120 in a variety of operation modes to provide for data acquisition in a fashion such that data from each touch sensor 130a-103d and each touch force sensor 140a-140b is correlated and consistent.

Figure 4:
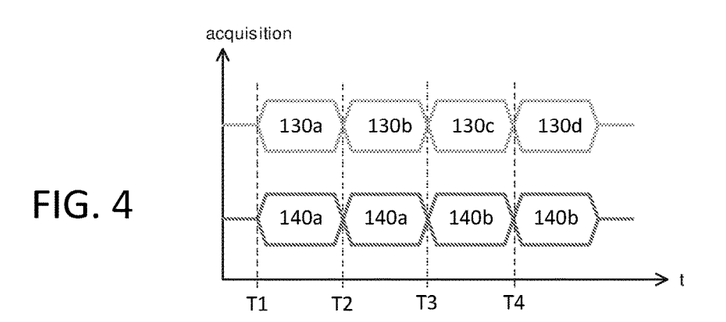
FIG. 4 is a timing diagram showing acquisition times of the touch and force sensors of FIGS. 2A and 2B in a first mode of operation.

In one operation mode, which can be referred to as a cell synchronization mode, data from the touch sensors 130a-130d is each acquired in order by the touch controller 122, beginning in response to a transition of the synchronization signal. This is shown in the timing diagram of FIG. 4. When touch location data is acquired sequentially from touch sensors 130a-130b, at times T1 and T2, touch force data is simultaneously acquired from the force sensor 140a (which is vertically aligned with touch sensors 130a-130b) also at times T1 and T2. Similarly, when touch location data is acquired sequentially from touch sensors 130c-130d (which is vertically aligned with force sensor 140b), at times T3 and T4, touch force data is simultaneously acquired from the force sensor 140b (at each acquisition of touch location data), also at times T3 and T4.

In an alternate cell synchronization mode, data from the touch sensors 130a-130d is each acquired in order by the touch controller 122, beginning in response to a transition of the synchronization signal. This is shown in the timing diagram of FIG. 5. When touch location data is acquired from touch sensor 130*a* at time T1, touch force data is simultaneously acquired from the force sensor 140*a* (which is vertically aligned with the touch sensor 130*a*) also at time T1. Similarly, when touch location data is acquired sequentially from touch sensor 130*c* at time T3, touch force data is simultaneously acquired from the force sensor 140*b* (which is vertically aligned with the touch sensor 130*c*) also at time T3.

Figure 5:
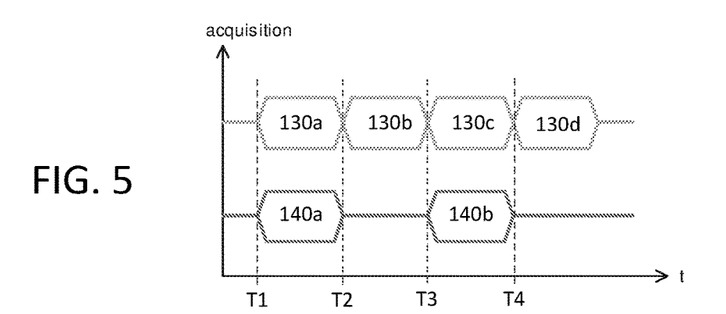
FIG. 5 is a timing diagram showing acquisition times of the touch and force sensors of FIGS. 2A and 2B in a second mode of operation.

While touch force data is not acquired concurrently with touch location data acquisition at times T2 and T4, provided that the rate of change of the touch location data and touch force data is substantially less than the acquisition rate thereof, accurate and correlated touch location and touch force data can be acquired this fashion while reducing power consumption due to cutting in half the number of touch force data acquisitions.

In an alternate cell synchronization mode, data from the touch sensors 130*a*-130*d* is each acquired in order by the touch controller 122, beginning in response to a transition of the synchronization signal. This is shown in the timing diagram of FIG. 6. When touch location data is acquired from touch sensor 130*a* and 130*b* at times T1 and T2, touch force data is acquired from the force sensor 140*a* during a window of time shown starting at time F1 and running from after the start of acquisition of touch location data at T1 to before the end of acquisition of touch location data at T2.

Figure 6:
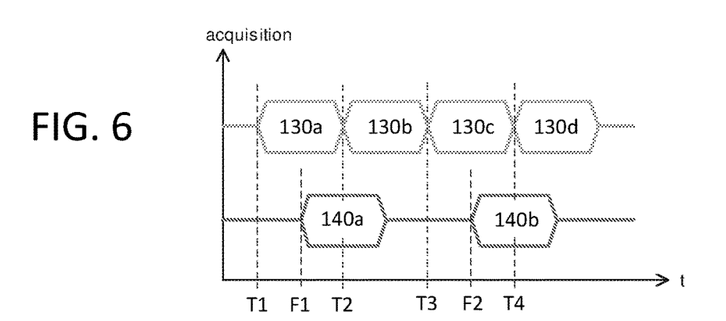
FIG. 6 is a timing diagram showing acquisition times of the touch and force sensors of FIGS. 2A and 2B in a third mode of operation.

Similarly, when touch location data is acquired sequentially from touch sensor 130*c* and 130*d* at times T3 and T4, touch force data is simultaneously acquired from the force sensor 140*b* during a window of time shown starting at time F2 and running from after the start of acquisition of touch location data at T3 to before the end of acquisition of touch location data at T4.

While touch force data is not acquired during the entire acquisition times for the touch sensors 130*a*-130*d* and force sensors 140*a*-140*b* provided that the rate of change of the touch location data and touch force data is substantially less than the acquisition rate thereof, accurate and correlated touch and touch force data can be acquired this fashion while reducing power consumption due to cutting in half the number of touch force data acquisitions.

Figure 7:
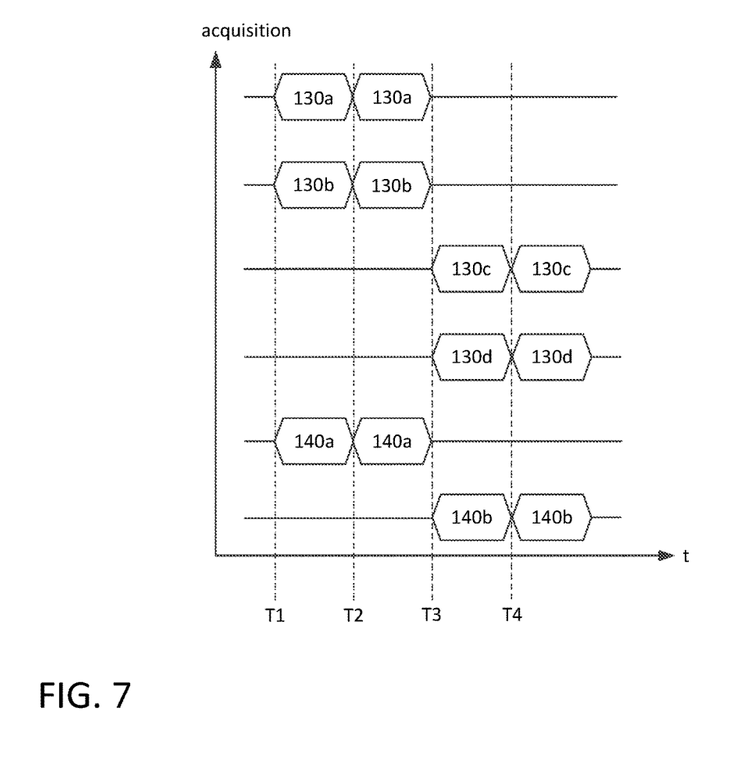
FIG. 7 is a timing diagram showing acquisition times of the touch and force sensors of FIGS. 2A and 2B in a fourth mode of operation.

In a further cell synchronization mode shown in FIG. 7, touch location data is acquired simultaneously from touch sensors 130*a*-130*b* and force sensor 140*a* at times T1 and T2, and is acquired simultaneously from the touch sensors 130*c*-130*d* and force sensor 140*b* at times T3 and T4.

Figure 10:
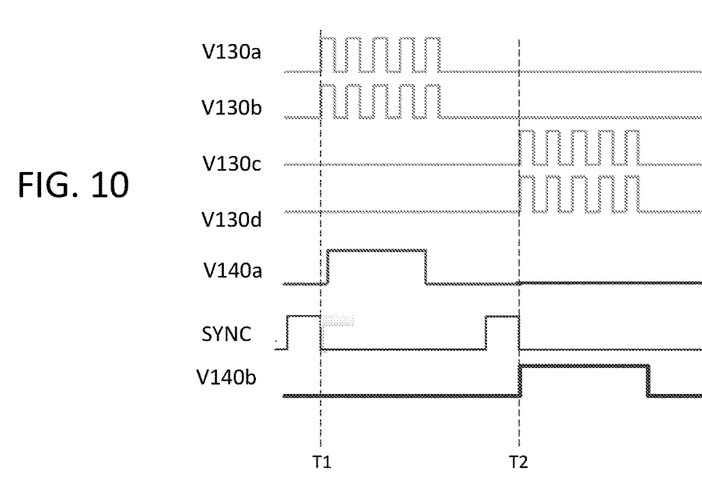
FIG. 10 is another timing diagram showing generation of drive signals for the touch and force sensors in response to a synchronization signal, when operating according to the fourth mode of operation.

The matrix 10 level operation of this operation mode is now described with reference to the timing diagram shown in FIG. 10. As shown, at the falling edge of the sync signal at time T1, drive signals to touch sensors 130*a*-130*b* are pulsed in a synchronized fashion, and a drive signal to force sensor 140*a* is pulsed (at a much lower frequency) in a synchronized fashion with the drive signals to touch sensors 130*a*-130*b*. Concurrent with the pulsing of these various drive signals, the appropriate sense lines are sensed to as to acquire the touch location data and the touch force data. As also shown, at the next falling edge of the sync signal at time T2, drive signals to touch sensors 130*c*-130*d* are pulsed in a synchronized fashion, and a drive signal to force sensor 140*b* is pulsed (at a much lower frequency) in a synchronized fashion with the drive signals to touch sensors 130*c*-130*d*.

Figure 8:
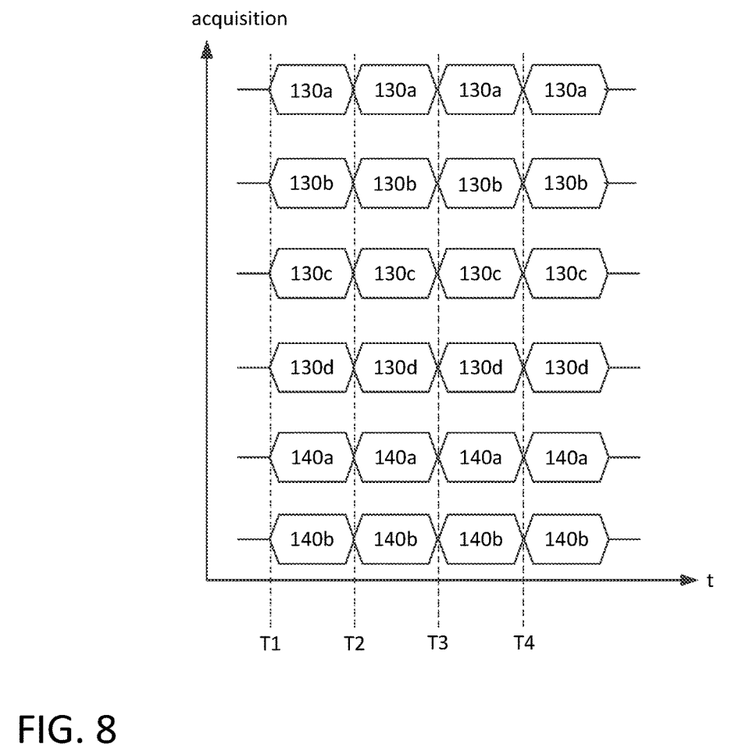
FIG. 8 is a timing diagram showing acquisition times of the touch and force sensors of FIGS. 2A and 2B in a fifth mode of operation.

In a further mode shown in FIG. 8, which can be referred to as a frame synchronization mode, in response to a transition of the synchronization signal, each touch sensor 130*a*-130*d* and each touch force sensor 140*a*-140*b* are respectively operated by the touch controller 112 and force controller 122 to simultaneously acquire a frame of data. In this way, the resulting acquired touch location data and touch force data is correlated, and the touch force data accurately corresponds to the pressure or force exerted by a user's finger on a display employing the touch screen system 100. Where the touch sensor 130 and force sensor 140 have different acquisition times, the slower acquisition time controls and the synchronization signal is generated so as to permit proper function.

Figure 9:
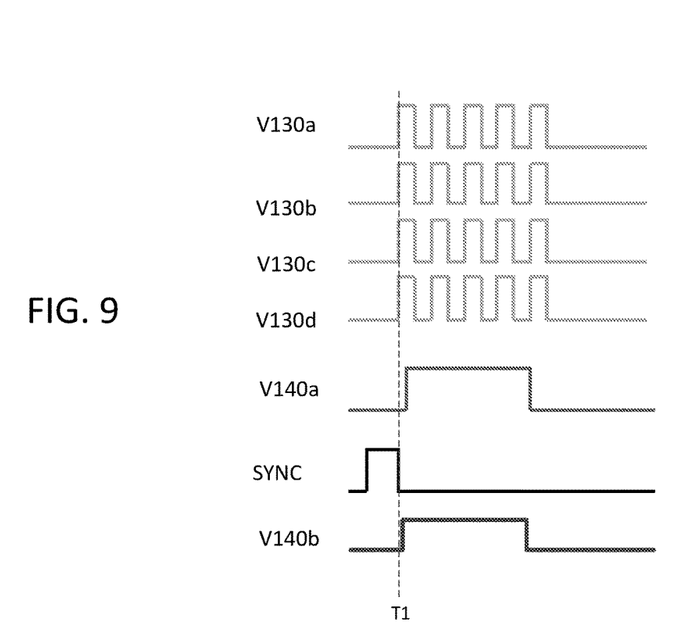
FIG. 9 is a timing diagram showing generation of drive signals for the touch and force sensors in response to a synchronization signal, when operating according to the fifth mode of operation.

A sample timing diagram for this frame synchronization mode is shown in FIG. 9. As shown, data is simultaneously acquired by the touch sensors 130*a*-130*d* and the force sensors 140*a*-140*b* at time T1.

The matrix 10 level operation of this operation mode is now described with reference to the timing diagram shown in FIG. 8. As shown, at the falling edge of the sync signal at time T1, drive signals to the touch sensors 130*a*-130*d* are pulsed in a synchronized fashion, and drive signals to force sensors 140*a*-140*b* are pulsed (at a much lower frequency) in a synchronized fashion with the drive signals to touch sensors 130*a*-130*d*. Concurrent with the pulsing of these various drive signals, the appropriate sense lines are sensed to as to acquire the touch location data and the touch force data.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

The invention claimed is:

1. An electronic device, comprising:
   a first touch circuit to be coupled to a first touch sensing unit, the first touch sensing unit comprising first drive lines and first sense lines intersecting the first drive lines;
   a second touch circuit to be coupled to a second touch sensing unit, the second touch sensing unit comprising second drive lines and second sense lines intersecting the second drive lines;
   a touch force circuit to be coupled to a touch force sensing unit, the touch force sensing unit comprising third drive lines and third sense lines intersecting the third drive lines;
   wherein the first touch circuit, second touch circuit, and touch force circuit are configured to:
      drive the first drive lines, second drive lines, and third drive lines as a function of a synchronization signal, and
      acquire data from the first sense lines, second sense lines, and third sense lines as a function of the synchronization signal.

2. The electronic device of claim 1,
   wherein the first touch circuit, second touch circuit, and touch force circuit drive the first drive lines, second drive lines and third drive lines as a function of the synchronization signal by, in response to a transition of the synchronization signal:
      driving the first drive lines,
      driving the second drive lines subsequent in time to driving the first drive lines, and
      driving the third drive lines during driving of the first drive lines and during driving of the second drive lines;

wherein the first touch circuit, second touch circuit, and touch force circuit acquire data from the first, second, and third sense lines as a function of the synchronization signal by, in response to a transition of the synchronization signal:
  acquiring data from the first and third sense lines, and
  acquiring data from the second and third sense lines subsequent in time to acquiring data from the first sense lines.

3. The electronic device of claim 1,
  wherein the first touch circuit, second touch circuit, and touch force circuit drive the first, second, and third drive lines as a function of the synchronization signal by, in response to a transition of the synchronization signal:
    driving the first drive lines,
    driving the second drive lines subsequent in time to driving the first drive lines, and
    driving the third drive lines during driving of the first drive lines;
  wherein the first touch circuit, second touch circuit, and touch force circuit acquire data from the first, second, and third sense lines as a function of the synchronization signal by, in response to a transition of the synchronization signal:
    acquiring data from the first and third sense lines, and
    acquiring data from the second sense lines subsequent in time to acquiring data from the first sense lines.

4. The electronic device of claim 1, wherein a rate of the acquiring of the data from the first, second, and third sense lines is greater than a rate of change of the data from the first, second, and third sense lines.

5. The electronic device of claim 1,
  wherein the first touch circuit, second touch circuit, and touch force circuit drive the first, second, and third drive lines as a function of the synchronization signal by, in response to a transition of the synchronization signal:
    driving the first drive lines,
    driving the second drive lines subsequent in time to driving the first drive lines, and
    driving the third drive lines in a time window beginning subsequent in time to beginning driving of the first drive lines and ending precedent in time to ending driving of the second drive lines;
  wherein the first touch circuit, second touch circuit, and touch force circuit acquire data from the first, second, and third sense lines as a function of the synchronization signal by, in response to a transition of the synchronization signal:
    acquiring data from the first sense lines,
    acquiring data from the second sense lines subsequent in time to acquiring data from the first sense lines, and
    acquiring data from the third sense lines in a time window beginning subsequent in time to beginning acquiring data from the first sense lines and ending precedent in time to ending acquiring data from the second sense lines.

6. The electronic device of claim 1, wherein the first and second touch sensing units have a first acquisition time associated therewith; wherein the touch force sensing unit has a second acquisition time associated therewith; wherein the first and second acquisition times are unequal; and wherein the synchronization signal is a function of a slower of the first and second acquisition times.

7. The electronic device of claim 1, wherein the data acquired from the first touch sensing unit by the first touch circuit comprises touch location data; wherein the data acquired from the second touch sensing unit by the second touch circuit comprises touch location data; and wherein the data acquired from the touch force sensing unit by the touch force circuit comprises touch force data.

8. The electronic device of claim 1, wherein the data acquired from the first touch sensing unit by the first touch circuit comprises touch force data.

9. The electronic device of claim 1, wherein the first and second touch circuits drive the first and second drive lines with first and second drive signals having first and second frequencies; wherein the touch force circuit drives the third drive lines with a third drive signal having a third frequency; and wherein the third frequency is less than the first and second frequencies.

10. The electronic device of claim 9, wherein the first and second frequencies are equal.

11. The electronic device of claim 1, wherein the first and second touch circuits drive the first and second drive lines with first and second drive signals having first and second frequencies; wherein the touch force circuit drives the third drive lines with a third drive signal having a third frequency; and wherein the third frequency is equal to the first and second frequencies.

12. The electronic device of claim 1, wherein the first touch circuit comprises a first touch integrated circuit; and wherein the second touch circuit comprises a second touch integrated circuit.

13. A method, comprising:
  generating a synchronization signal at a host device; and
  in response to the synchronization signal:
    driving first, second, and third drive lines using a first touch circuit, a second touch circuit, and a touch force circuit; and
    acquiring data from first, second, and third sense lines intersecting the first, second, and third drive lines using the first touch circuit, the second touch circuit, and the touch force circuit;
    wherein the data acquired from the first sense lines comprises touch location data;
    wherein the data acquired from the second sense lines comprises touch location data;
    wherein the data acquired from the third sense lines comprises touch force data;
    wherein the synchronization signal is not a system clock signal.

14. The method of claim 13, wherein driving the first, second, and third drive lines comprises, in response to a transition of the synchronization signal:
  driving the first drive lines,
  driving the second drive lines subsequent in time to driving the first drive lines, and
  driving the third drive lines during driving of the first and second drive lines;
wherein acquiring data from the first, second, and third sense lines comprises, in response to the transition of the synchronization signal:
  acquiring data from the first sense lines,
  acquiring data from the second sense lines subsequent in time to acquiring data from the first sense lines, and
  acquiring data from the third sense lines during acquisition of data from the first and second sense lines.

15. The method of claim 13, wherein driving the first, second, and third drive lines comprises, in response to a transition of the synchronization signal:
  driving the first drive lines,
    driving the second drive lines subsequent in time to driving the first drive lines, and
    driving the third drive lines during driving of the first drive lines;
  wherein acquiring data from the first, second, and third sense lines comprises, in response to the transition of the synchronization signal:
    acquiring data from the first and third sense lines, and
    acquiring data from the second sense lines subsequent in time to acquiring data from the first sense lines.

16. The method of claim 15, wherein a rate of the acquiring of the data from the first, second, and third sense lines is greater than a rate of change of the data from the first, second, and third sense lines.

17. The method of claim 13, wherein driving the first, second, and third drive lines comprises, in response to a transition of the synchronization signal:
  driving the first drive lines,
    driving the second drive lines subsequent in time to driving the first drive lines, and
    driving the third drive lines in a time window beginning subsequent in time to beginning driving of the first drive lines and ending precedent in time to ending driving of the second drive lines;
  wherein acquiring data from the first, second, and third sense lines comprises, in response to the transition of the synchronization signal:
    acquiring data from the first sense lines,
    acquiring data from the second sense lines subsequent in time to acquiring data from the first sense lines, and
    acquiring data from the third sense lines in a time window beginning subsequent in time to beginning acquiring data from the first drive lines and ending precedent in time to ending acquiring data from the second drive lines.

18. An electronic device, comprising:
  a first touch circuit to be coupled to a first touch sensing unit;
  a second touch circuit to be coupled to a second touch sensing unit;
  wherein one of the first touch circuit and the second touch circuit is configured to generate a synchronization signal;
  wherein the first and second touch circuits are configured to, in response to the synchronization signal, synchronously acquire data from the first and second touch sensing units, respectively.

19. The electronic device of claim 18, wherein the first touch sensing unit has a first acquisition time associated therewith; wherein the second touch sensing unit has a third acquisition time associated therewith; wherein the first and third acquisition times are unequal; and wherein the synchronization signal is a function of a slower of the first and third acquisition times.

20. The electronic device of claim 18, wherein the data acquired from the first touch sensing unit by the first touch circuit comprises touch location data.

21. The electronic device of claim 18, wherein the data acquired from the first touch sensing unit by the first touch circuit comprises touch force data.

22. The electronic device of claim 18, further comprising a touch force circuit coupled to a touch force sensing unit; wherein the touch force circuit is also configured to, in response to receipt of the synchronization signal, synchronously acquire data from the touch force sensing unit, with the data acquired from the touch force sensing unit comprises touch force data; and wherein the data acquired from the first and second touch sensing units by the first and second touch circuits comprises touch location data.

23. The electronic device of claim 18, wherein the first and second sensing unit comprise capacitive touch sensors.

* * * * *